May 4, 1965 G. W. COPE 3,181,708
AUTOMATIC COUPLER
Filed May 27, 1963 6 Sheets-Sheet 1
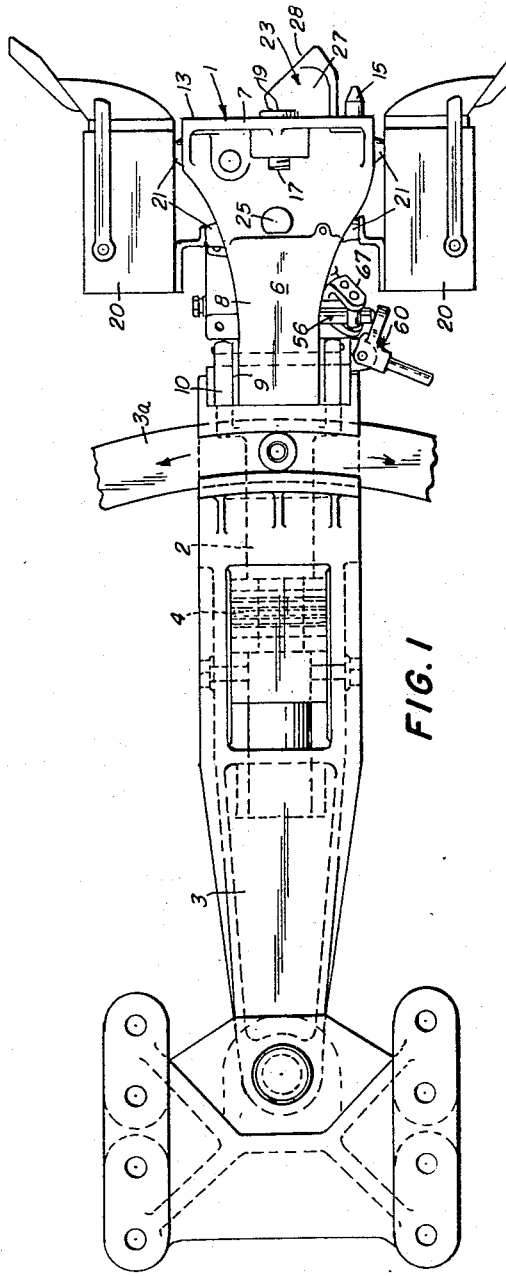
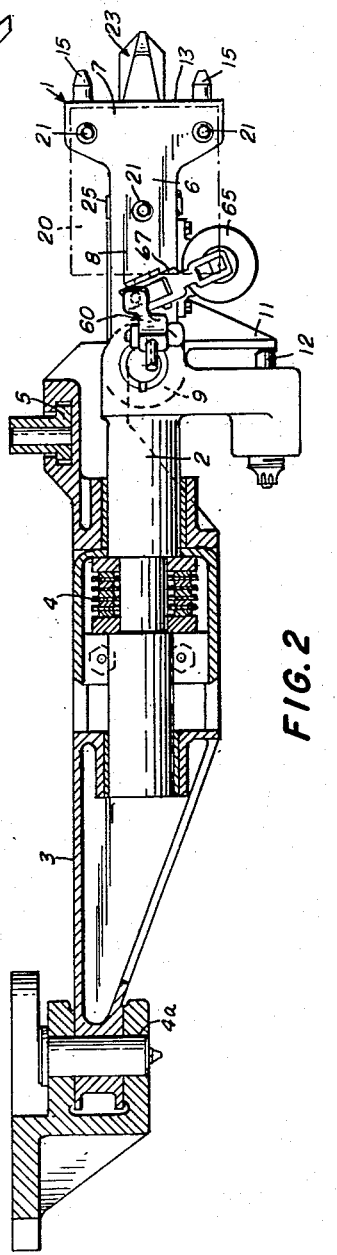
INVENTOR
GEOFFREY W. COPE
BY *Wilmer Mechlin*
ATTORNEY

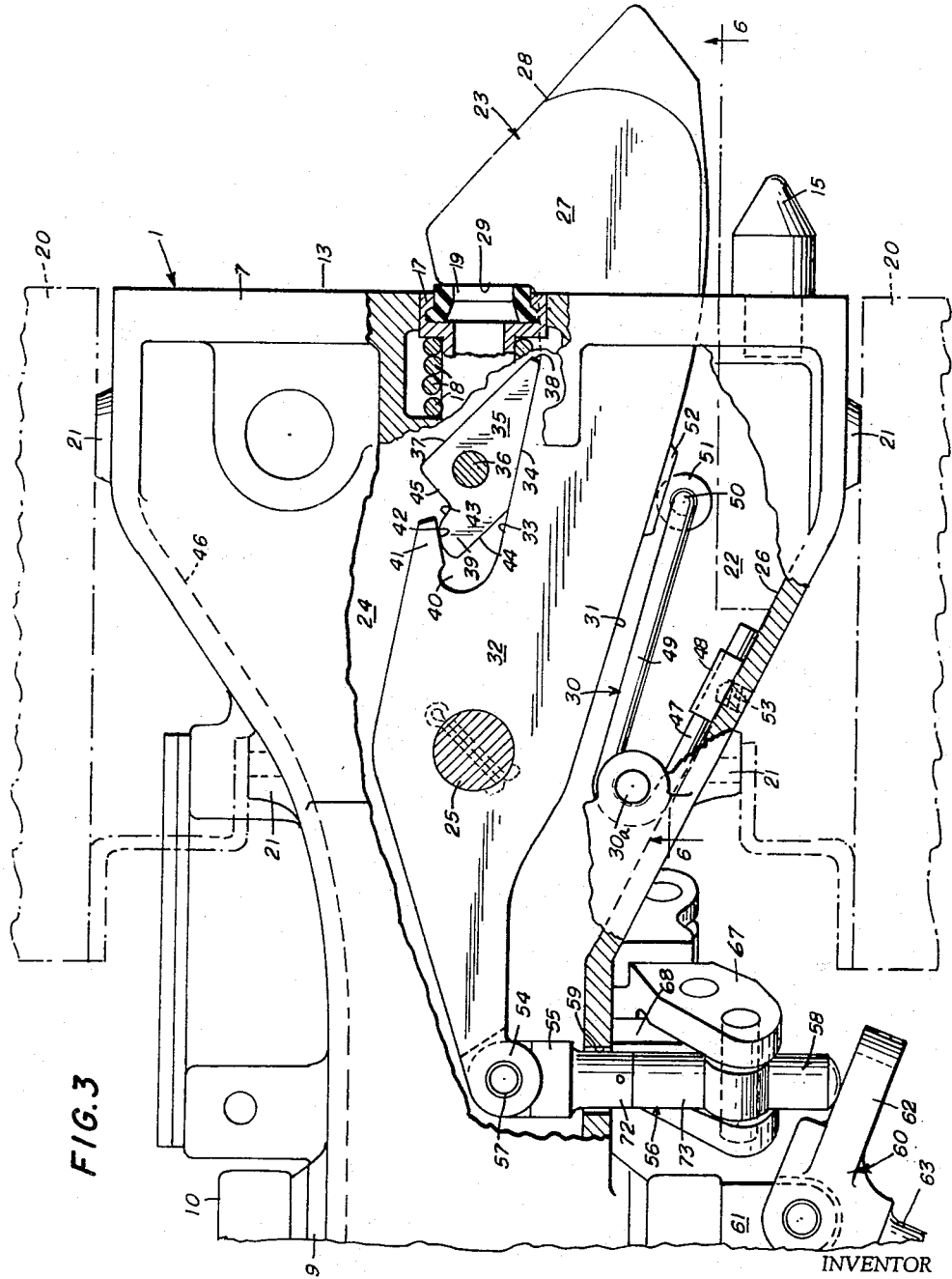

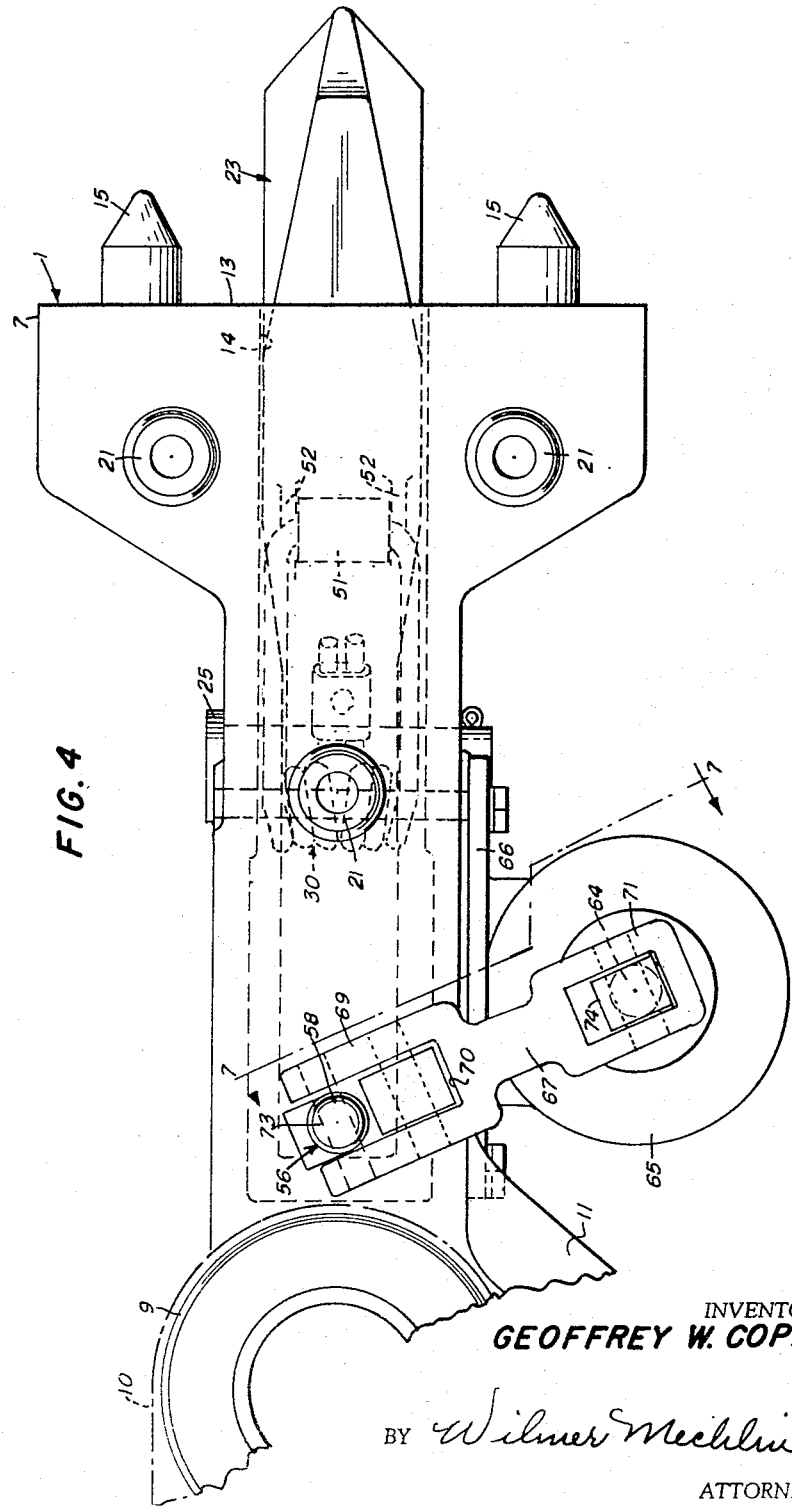

INVENTOR
GEOFFREY W. COPE

BY *Wilmer Mechlin*

ATTORNEY

INVENTOR
GEOFFREY W. COPE
BY Wilmer Mechlin
ATTORNEY

May 4, 1965  G. W. COPE  3,181,708
AUTOMATIC COUPLER
Filed May 27, 1963  6 Sheets-Sheet 6

INVENTOR
GEOFFREY W. COPE
BY *Wilmer Mechlin*
ATTORNEY

# United States Patent Office 3,181,708
Patented May 4, 1965

3,181,708
AUTOMATIC COUPLER
Geoffrey W. Cope, Williamsville, N.Y., assignor to Symington Wayne Corporation, Salisbury, Md., a corporation of Maryland
Filed May 27, 1963, Ser. No. 283,395
15 Claims. (Cl. 213—104)

This invention relates to automatic couplers of the hook type, generally known as subway couplers and used on subway cars for simultaneous automatic coupling of cars and train service lines.

The primary object of the present invention is to provide an automatic subway coupler, which, contrary to prior such coupler, is capable of maintaining full bearing between its hook and that of a coupler to which it is mated despite failure of the hook spring of one of the couplers.

Another object of the invention is to provide a subway coupler which is swivelly connectable to a drawbar and couples automatically and is adaptable for automatic or manual uncoupling by an operating mechanism of such construction and arrangement as to enable the coupler to mount not only couplers for automatic connection and disconnection of train service lines but also a power device for its own automatic uncoupling within a less length between pushing face and pivot than heretofore feasible.

An additional object of the invention is to provide an automatic subway coupler, which conventionally uses cam means in its operating mechanism for enabling a pair of mated couplers to be uncoupled by an uncoupling operation applied to either coupler, but is unconventional in employing the same cam means for maintaining full bearing between the hooks of the mated couplers on failure of the hook spring of either.

A further object of the invention is to provide an automatic subway coupler wherein the spring force on the hook is both adjustable and so applied to the hook as to minimize wear.

Another object of the invention is to provide an automatic subway coupler wherein the openings in its body in which parts of the operating mechanism are received are at least substantially closed by those parts, thereby practically preventing foreign matter from entering the body through such openings and correspondingly minimizing impairment of operation of the coupler and wear of parts contained in the body by such matter.

Other objects and advantages of the invention will appear hereinafter in the detailed description, be particularly pointed out in the appended claims and be illustrated in the accompanying drawings, in which:

FIGURE 1 is a plan view of a subway coupler assembly including a preferred embodiment of the subway coupler of the present invention;

FIGURE 2 is a side elevational view of the assembly of FIGURE 1 with portions of the drawbar broken away and shown in section to more clearly illustrate the connection between the coupler and a car;

FIGURE 3 is a plan view on an enlarged scale of the coupler of FIGURE 1 with portions broken away and shown in section to more clearly illustrate certain of the details of construction;

FIGURE 4 is a side elevational view of the coupler of FIGURE 3;

Figure 5:
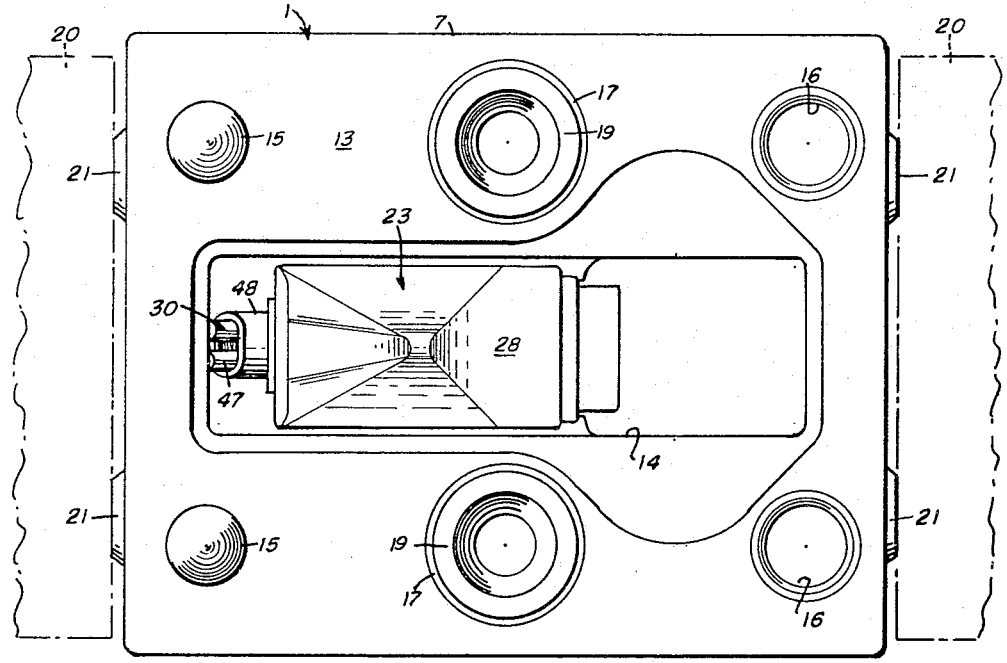
FIGURE 5 is a front elevational view of the coupler of FIGURE 3.
Figure 6:
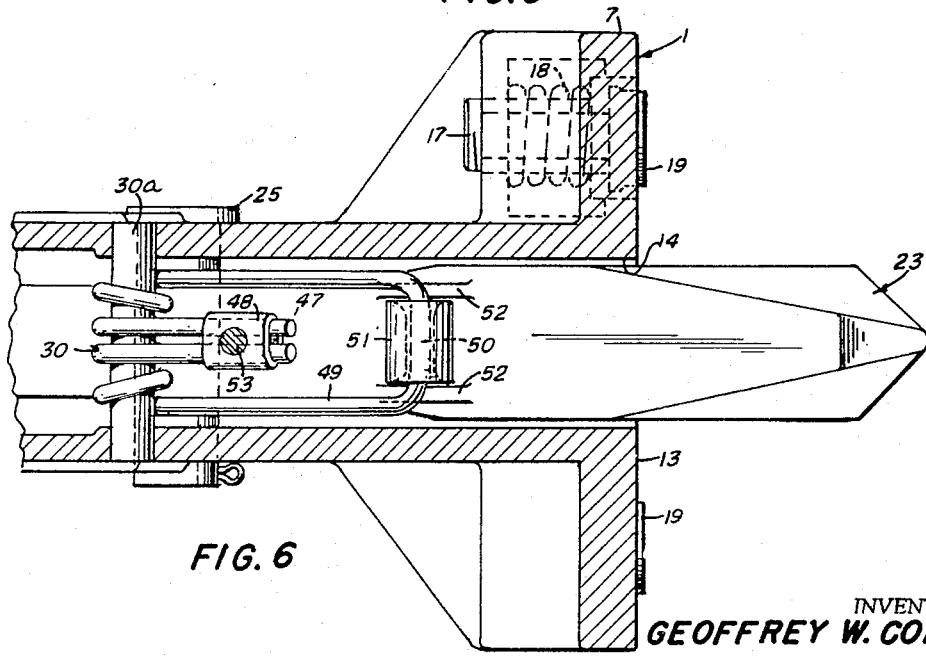
FIGURE 6 is a fragmentary vertical sectional view taken along lines 6—6 of FIGURE 3.
Figure 7:
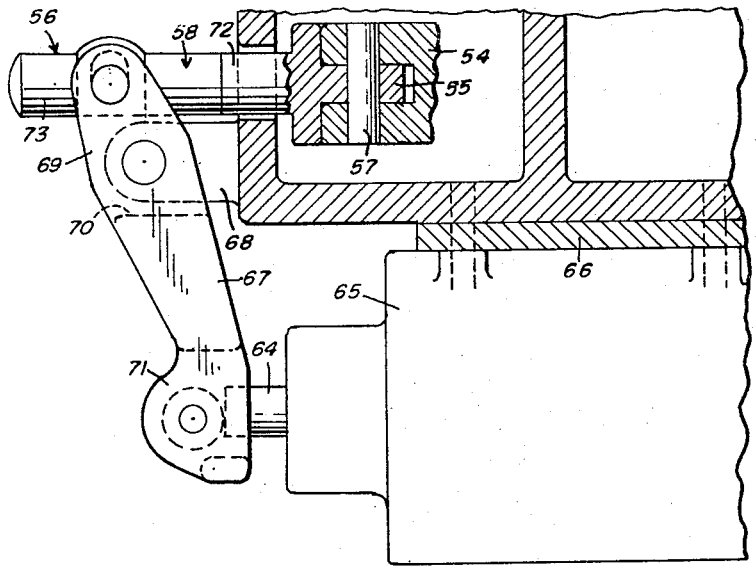
FIGURE 7 is a fragmentary vertical sectional view taken along lines 7—7 of FIGURE 4.

Referring now in detail to the drawings in which like reference characters designate like parts, the improved automatic subway or hook-type coupler of the present invention, designated as 1, may be long-bodied for containing a suitable cushioning device and telescopingly receiving a drawbar universally connected to a car, in the manner of the coupler disclosed in Van Dorn Patent No. 2,214,036, dated September 10, 1940. However, for more freedom in its vertical movement, the coupler 1 is preferred to be relatively short-bodied and swivelly, articulatedly or pivotally connected for relative vertical swinging to a yoke 2 in a drawbar 3 which contains both the yoke and a rubber or other suitable cushioning device 4, is pivotally connected for horizontal swinging to the underside of the body, indicated at 5, of a subway or like car and is supported forwardly of its pivotal connection on a radial carrier bar 3a suspended from the car body.

In its preferred form, the coupler 1 has a body 6 comprised of a head 7 and shank 8, the latter having at its butt end opposite the head a horizontally apertured hinge loop 9 for swivel, hinged or pivotal connection for relative vertical swinging to ears 10 on the front end of the yoke 2. Depending from the loop 9 is an integral arm 11, which by engagement with a forwardly acting, spring-pressed plunger 12 depending from the yoke 2, holds the coupler normally at coupling height and yieldably resists its downward swinging.

Designed to couple with either a counterpart or a conventional subway coupler, the coupler 1 has its head 7 projecting or extending above and below its shank 8 and on the head has a vertically directed front or pushing face 13 which is interrupted centrally by a horizontally or laterally elongated slot, opening or mouth 14. For interlocking the head 7 to that of another coupler, there are provided adjacent the corners at one side of the face 13 a pair of guidepins 15 and adjacent the opposite corners at the other side a pair of sockets 16 for interfitting, respectively, with corresponding sockets and guidepins of another coupler, the guidepins being conically tipped to afford a gathering range of substantial extent. The air connections for the usual two train air service lines (not shown) are made, as usual, through the front face 13 of the head 7, in the illustrated embodiment by a pair of spring-pressed bushings or air couplers 17 extending longitudinally through the head above and below both the slot 14 and the adjoining part of the shank 8 and threaded rearwardly of the head for attachment of the air lines. Urged forwardly by their springs 18, the bushings 17 mount in their front ends rubber grommets 19 for end-to-end sealing engagement with the air couplers of a mating coupler.

In keeping with its ability to couple or connect automatically with a coupler of another car and simultaneously connect the air and electrical train service lines between the cars, the coupler 1 not only has the air couplers 17 for the air service lines but, depending on the desired number and location of the electrical couplings or connectors 20, has at the bottom or, as illustrated, sides of its head 7 and adjoining part of its shank 8, boss-reinforced, threaded sockets 21 for bolting and so mounting on the coupler the one or more boxes each containing an insulator block (not shown) mounting the electrical contacts (not shown).

The laterally elongated slot 14 interrupting the pushing face 13 of the head 7 opens rearwardly onto the cavity 22 in the hollow shank 8 of the body 6, in one, hereinafter termed for differentiation the inner or inboard side of which is accommodated the coupler's hook 23, leaving in the other, outer or outboard side, a throat or opening 24 for receiving the hook of a mating coupler. Projecting into the cavity or hollow interior 22, the hook 23 is pivotally connected for horizontal swinging to the body 6 by a pivot or hook pin 25 extending vertically through the shank 8, preferably adjacent or on the latter's longitudinal centerline, and projects forwardly through the inner or inboard side of the slot 14. Backed by the inboard or inner side or side wall 26 of the shank 8 and facing toward the throat or hook-receiving opening 24 in the cavity 22, the hook 23 has a conventionally configured front end or hook portion or head 27 having a forwardly and inwardly sloping flat wedging or front face 28 intersecting or merging rearwardly with an outwardly projecting, rearwardly facing flat pulling face 29. As in a conventional subway coupler, the pulling face 29, in both coupled and uncoupled positions of the hook 23, straddles the longitudinal centerline of the body 6 and is substantially coplanar with the pushing face 13. The hook is urged outwardly toward the throat 24 in the cavity 22 by a spring 30 acting between the back 31 of its stem or shank 32 and the inner side wall 26 of the shank 8 at the outer side of the cavity 22, and is stopped in its outward movement by engagement of a preferably flat front face or surface 33 on its stem rearwardly of the pulling face 29 with a correspondingly flat inner or confronting side 34 of a cam 35.

Connected for horizontal swinging or pivoting to the body 6 of the coupler by a pivot or cam pin 36 extending vertically through the shank 8 intermediate the hook pin and the head 7, the cam 35 has a flat outer side 37 converging forwardly toward its inner side 34 and merging therewith in a rounded toe 38 at the cam's front or forward end. For interconnecting or intercoupling it with the hook 23, the cam 35, at the opposite side of the cam pin 36 from the toe 38, has a rearwardly projecting rocker, lever or cam arm 39 which at all times is received, contained or retained in a pocket or recess 40 in the stem 32 rearwardly of the cam-engaging front face 33 on the stem. This pocket 40 is bounded outwardly toward the throat 24 by a jaw or claw 41 at all times disposed outboardly or outwardly of and longitudinally overlapping the rocker arm 39 and having a preferably flat inner bearing face 42 adapted to engage and bear against a preferably arcuately or cylindrically convex, outer or confronting bearing surface 43 on the rocker arm.

Figure 9:
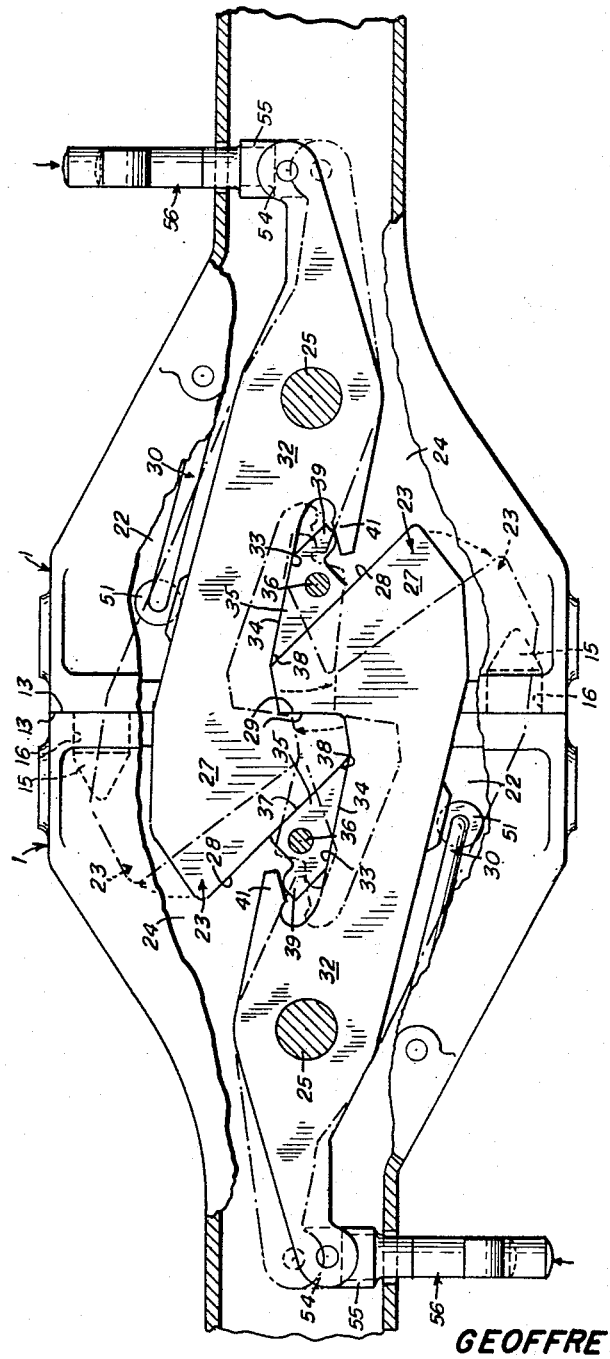
FIGURE 9 is a plan view on a scale smaller than FIGURE 3 showing a pair of the couplers in mated relation with portions broken away and shown in section to more clearly illustrate their operation.

The bearing face 42 and surface 43, respectively, on the jaw 41 and the rocker arm 39 are arranged to contact or engage in the normal or coupled position of the hook 23 shown in FIGURES 3 and 9 and also as the hook and that of a mating coupler are swung apart in an uncoupling operation. To the latter end, suitable provision is made to accommodate the relative movement or swinging of the cam 35 and the hook 23 on inward swinging of the latter toward the inner or adjoining side of the slot 14. In the illustrated embodiment, this is accomplished by angling the inner surface or face 44 of the rocker arm rearwardly and outwardly relative to the inner side 34 of the cam 35 and setting back the rear edge 45 of the main part of the cam above the arm so that neither that edge nor the arm's inner surface will interfere with full inward swinging of the hook by engagement with a confronting surface of the latter.

In coupling automatically with another coupler, the coupler 1 operates in the same manner as a conventional subway coupler, the wedging face 28 on its hook 23 first engaging the wedging face on the hook of the other coupler and the contact between these faces, as the wedge-shaped front end portion 27 of each hook enters the throat 24 in the body 6 of the other coupler, serving to force the hooks inwardly against their springs 30 until the wedging faces clear each other and the hooks are free to swing outwardly under force of their springs and bring their pulling faces 29 into engagement. Also, the cam 35 shares with the unlocking cam of the conventional coupler the functions of limiting or stopping the outward movement of its hook in the unlocked condition of the coupler and, in an uncoupling operation, of exerting an outward camming force on the hook of the mating coupler in the lateral spreading, separating or movement apart of the hooks upon which the uncoupling or disengagement of the couplers is dependent. In a conventional coupler, the lateral spreading force on both hooks is derived from the camming action exerted through the opposite ends of the unlocking cam of one or the other coupler, the cam being turned in a direction to separate the hooks by a link-and-lever arrangement, a lever of which ordinarily is fixed to the cam and connected to a link extending rearwardly substantially longitudinally of the coupler through a slot in the top wall of the body. In the coupler of this invention, the toe 38 at the front end of the cam 35, in an uncoupling operation, rides on and pushes against the wedging face 28 on the hook of the mating coupler in exerting the lateral camming force by which that hook is moved or forced to swing backwardly toward the outer or outboard side or sidewall 46 of the cavity 22 into which its front end portion projects. However, this camming action on the one hook is derived, not from a force applied directly to the cam, but rather from a force applied to the other hook in opposition to its spring 30 and transmitted by that hook through its jaw 41 to the rocker arm 39 of the cam.

The application of the uncoupling force through a hook and cam to the other hook, rather than through a cam to both hooks, in eliminating the usual longitudinally extending uncoupling rod or link and the uncovered opening in the top wall of the body through which the rod is connected to the cam, is of definite advantage in markedly reducing the length of the operating mechanism and thus the coupler, particularly when the mechanism is automatically operated, and in eliminating a main entry port for foreign matter into the coupler's interior. However, probably its outstanding advantage is its effect upon mated couplers in case the hook spring 30 of one breaks under service forces. In such case, in conventional subway couplers, the hook with the intact spring will maintain its normal or coupled position laterally of the body, but the hook with the broken spring can and under service shocks ordinarily will swing inwardly away from the other hook toward the adjoining side of the body, with consequent decrease in the bearing area between the pulling faces of the hooks and corresponding increase in the stresses on them. By contrast, under identical conditons, the hooks 23 of mated couplers of the present invention will both remain in normal or coupled position with full bearing between their pulling faces 29. This is the result of the interlock between the hook 23 of each coupler and its cam 35 provided by the jaw 41 on the hook and the rocker arm 39 on the cam.

In the coupled relation of a pair of the couplers of this invention, shown in FIGURE 9, each of the cams 35 lies between its own and the other hook with its inner and outer sides 34 and 37 angled relatively in correspondence with and engaging the front or stop surface 33 on the stem 32 of its own hook and the wedging face 28 of the other hook. Ordinarily maintained by the outward pressure exerted by the hook springs 30 on both hooks, the engagement or contact of the sides of each cam with the confronting faces or surfaces on the two hooks will be maintained, despite breakage of one of the springs, by the pressure exerted by the hook with the intact spring on the cam 35 of the hook of the other coupler. This pressure, applied through the wedging face 28 of the hook with the intact spring to the outer side 37 of the cam of the other coupler, exerts through that side a lateral force on the cam forwardly of the cam pin 36 toward or in the direction of the inner side 26 of the body 6 in which the cam is mounted. Acting as a lever with the cam pin 36 its fulcrum, the cam 35, in turn, applies through the bearing surface 43 on its rocker arm 39, a force in the opposite or outward direction on the confronting bearing face 42 on the jaw 41 of its hook 23 which effectively prevents the latter from swinging outwardly despite its broken spring and so maintains the hooks in normal position and with full bearing between their pulling faces 29.

The safeguard against overstressing of the hooks of mated couplers by breaking of a hook spring, provided by the interlock between each hook and its cam, preferably is augmented by using as the hook spring 30, in place of the conventional leaf spring, an inherently more break-resistant coiled-wire torsion spring, the outer leg 47 of which, formed by the free ends of the wire, lies along the inner wall 26 of the cavity 22 in the body 6, with the free ends connected by a clip 48. In turn, the inner leg 49 of the spring 30 mounts on the cross-loop 50 at its outer end a roller 51 rolling against the back 31 of the hook 23 and guided in its movement relative thereto in a guideway conveniently defined by vertically spaced, parallel ribs 52 formed on and outstanding from the back. Positioned or located in the cavity 22 by a pin 30a, the preferred spring not only is inherently stronger than the conventional spring but its roller contact with the hook reduces the wear between itself and the hook. In addition, by providing in the inner wall 26 of the body a set screw 53 and appropriately socketing the clip 48 to receive the screw, the latter, by moving the inner leg 49 of the spring toward or away from its outer leg 47 in the normal position of the hook 23, is enabled to adjust the outward torsional force exerted by the spring on the hook.

Except for the electrical contact box or boxes 20 mounted on the bottom or, as illustrated, sides 26 and 46 of the body 6, the force applied to unlock the coupler from a mated coupler might be applied to its hook 23 forwardly of the latter's pivot or hook pin 25. However, in view of the forward position required to be occupied by the contact box or boxes 20 for enabling the train electric service lines to be automatically connected or coupled incident to the coupling of a pair of couplers by their hooks 23, it is more convenient and preferred to apply the unlocking force to the hook rearwardly of the hook pin 25. To this end, the stem 32 of the hook 23 is provided with a tail or rearward extension 54 projecting or extending into the cavity 22 rearwardly beyond the hook pin 25 and pivotally or swivelly connected to a head 55 of a plunger 56, as by the illustrated tongue-and-slot pivotal connection 57 in which, for vertical positioning of the head, the latter is tongued to interfit with the bifurcated or slotted rear end of the tail. Designed to act, reciprocate or move transversely or laterally of the body 6 in swinging the head 27 of the hook 23 inwardly to unlocking position against the force of the hook spring 30, the plunger 56 has a shank or stem 58 which preferably is formed integrally with its head 55 and projects substantially normal to the body's longitudinal centerline through an aperture 59 of corresponding cross-section in the inner side wall 26 of the body, with the play or clearance between the shank and the side of the aperture held to a minimum to inhibit entry of dirt or other foreign matter therebetween into the cavity 22.

If the coupler 1 is to be unlocked by manual actuation of the plunger 56, a manual operating lever 60 of bellcrank or like suitable shape can be pivotally mounted on a bracket 67 outstanding from the front portion of the yoke 2 in position for engagement of its inner arm 62 with the butt or outer end of the shank 58 and its outer arm 63 serving as a handle. Alternatively or at the same time, the coupler can be made unlockable automatically from a distant operating station by mounting on the body 6 a suitable remote controlled actuating or power device, conveniently in the form of an air or a fluid pressure-responsive piston 64, the cylinder 65 housing which is suspended from the body on a mounting plate 66 bolted or otherwise attached to the body's underside. Projecting or outstanding from the cylinder 65 at the same side of the body 6 as the shank 58 of the plunger 56, the piston 64 is disposed below and preferably parallel to the shank. For connecting the piston 64 for operation or actuation to the plunger 56, there preferably is employed a lever 67 fulcrumed intermediate its ends on a bracket 68 fixed to and outstanding from the inner side 26 of the body 6 and pivotally connected at its upper end to the piston 64 and having roller contact at its lower end with the end of the plunger 56. The lever 67 conveniently is formed with a bifurcated or forked upper end portion 69, in the slot 70 in which the bracket 68 and the plunger shank 58 are received and an apertured lower end portion 71 for receiving the outer end of the piston 64.

Figure 8:
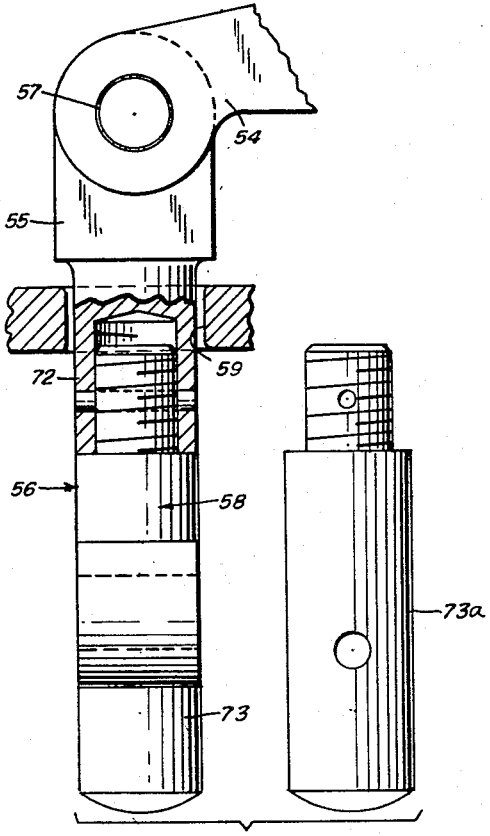
FIGURE 8 is a plan view of an enlarged scale of the plunger and its interchangeable extensions.

Depending on the preference, the body 6 of a given coupler and the yoke 2 of its drawbar 3 may be equipped with either or both of the mounting brackets 61 and 68 for adapting the coupler for manual or automatic operation or both. The plunger 56, as well, may be suited for selective automatic or manual operation by making its shank of a length to be engaged by the manual lever 60 and flattening and aperturing the shank inwardly of its outer end for pin-connection to the automatic lever 67. If, as is preferred to facilitate assembly, the shank 58 for both automatic and manual operation is of two rather than one-part construction with a stub inner part 72 onto which a dual purpose outer part 73 is threaded, the same unitary head 55 and inner part 72 can be readily adapted only for manual operation by substituting for the outer part 73 of the illustrated coupler, the manual-actuation adapter 73a shown in FIGURE 8. As will be noted, the adapter 73a is apertured inwardly of its outer end for the reception of a suitable turning tool.

While the manual lever 60 is illustrated as mounted on the yoke 2, it as well could be mounted on the body 6 of the coupler and ordinarily would be so mounted on a coupler adapted for manual rather than selective automatic or manual unlocking. However, it is in the preferred form in which the coupler is not only unlockable automatically or by remote control but is pivotally connected to a yoke. Advantage in compactness of the operating mechanism over that of a conventional subway coupler similarly connected and operated is particularly apparent. With the link or operating rod connected to the double-acting unlocking cam extending longitudinally of its body, a conventional coupler, if power actuated, as a practical matter must mount the actuating device on top or side of its body and the device must act longitudinally of the coupler, this necessarily consuming considerable length. By contrast, the operating mechanism of the coupler 1 of the present invention, by applying the unlocking force to the hook 23 through the laterally or transversely acting plunger 56, readily can and does have its power actuated device, the piston 64, mounted crosswise or laterally of the body 6, permissively above but more conveniently below the body and requires only the lever 67 to operatively connect the plunger and the power piston. The relative compactness of its operating mechanism thus enables the coupler 1 to be equipped for automatic unlocking within a body length very considerably less than heretofore practicable.

Whether the coupler 1 is unlocked manually or automatically, the action in unlocking a pair of mated couplers is the same, the plunger 56 of one coupler being pushed inwardly by the appropriate lever 60 or 67 and, by the outward lateral force so exerted on the tail 54 of the hook 23, causing the hook to pivot or fulcrum on the hook pin 25 and swinging the front end portion 27 of the hook inwardly toward the inner side 26 of the body 6. In process, the toe 38 of the cam 35 is swung in the opposite direction by engagement of the jaw 41 on the stem 32 of the hook with the cam's rocker arm 39, this, by the camming action of the toe on the wedging face 28 of the hook of the mated coupler, causing the latter hook to swing outwardly. The inward swinging of the first hook and outward swinging of the second continues until their pulling faces 29 have cleared. Thus unlocked or uncoupled and free to separate, the heretofore mated couplers on separation coincidentally uncouple or disconnect their train air and electrical service line couplers or connectors. The reverse or coupling operation is entirely automatic, the first contact being between the wedging faces 28 on the hooks and this contact as it continues forcing the hooks to swing inwardly away from each other until, with the guidepins 15 of each coupler socketed in the pushing face 13 of the other, the outer end portions 27 of the hooks have cleared each other so that the hooks can be swung outwardly toward each other by the hook springs 30 to the point at which they are stopped by their cams 35 with their pulling faces 29 fully overlapping, this condition being reached substantially coincidentally with engagement of the pushing faces of the couplers.

From the above-detailed description, it will be apparent that there has been provided an improved automatic subway coupler which safeguards against both overstressing of the hooks of mated couplers on breaking of a hook spring and entry of foreign matter into the body of the coupler through transverse openings therein for parts of the operating mechanism and also enables a coupler designed for pivotal connection to a yoke of a drawbar to be adapted for automatic unlocking within a less shank length than heretofore practicable. It should be understood that the described and disclosed embodiment is merely exemplary of the invention and that all modifications are intended to be included that do not depart from the spirit of the invention or the scope of the appended claims.

Having described my invention, I claim:

1. An automatic coupler comprising a body having a forwardly opening cavity therein, a hook projecting into said cavity and pivotally connected therewithin to said body, spring means acting between a side of said body and said hook for urging said hook toward an opposite side of said body, and means mounted on said body and interconnected with said hook for transmitting an unlocking force applied to said hook in opposition to said spring force to a hook of another coupler mated with said first named coupler.

2. An automatic coupler comprising a body having a forwardly opening cavity therein, a hook projecting into said cavity and pivotally connected therewithin to said body, spring means acting between a side of said body and said hook forwardly of the pivotal connection therebetween for urging said hook toward an opposite side of said body, and cam means mounted in said cavity and permanently interconnected with said hook for transmitting an unlocking force applied to said hook in opposition to spring force to a hook of another coupler mated with said first-named coupler.

3. An automatic coupler comprising a body having a forwardly opening cavity therein, a hook projecting into said cavity and pivotally connected therewithin to said body, spring means acting between a side of said body and said hook forwardly of the pivotal connection therebetween for urging said hook toward an opposite side of said body, cam means pivotally mounted in said cavity and engageable with said hook for limiting swinging thereof under force of said spring, and means on said cam means and engageable by means on said hook for transmitting an unlocking force applied to said hook in opposition to said spring force to a hook of another coupler mated with said first-named coupler.

4. An automatic coupler comprising a body having a forwardly opening activity therein, a hook projecting into said cavity and pivotally connected therewithin to said body, spring means acting between a side of said body and said hook forwardly of the pivotal connection therebetween for urging said hook toward an opposite side of said body, said hook on coupling of said coupler with another coupler being yieldably held by said spring means in locking relation to a spring-urged hook of said other coupler received in said cavity, and means mounted on said first-named coupler and permanently interconnected with the hook thereof, said interconnected means on said coupling engaging both of said hooks and being operative under force of said second-named hook for yieldably resisting pivoting of said first-named hook in a direction away from second-named hook in case of breakage of said spring means.

5. An automatic coupler comprising a body having a forwardly opening cavity therein, a hook projecting into said cavity and pivotally connected therewithin to said body, spring means acting between a side of said body and said hook forwardly of the pivotal connection therebetween for urging said hook toward an opposite side of said body, said hook on coupling of said coupler with another coupler being yieldably held by said spring means in interlocking relation to a spring-urged hook of said other coupler received in said cavity, and cam means mounted on said body of said first-named coupler and engagable on said coupling by both of said hooks, said cam means being interconnected with said first-named hook for transmitting therefrom an unlocking force to said second-named hook, and said cam means on breaking of said spring means with said hooks interlocked being operative under a yieldable force applied thereto by said second-named hook to resist pivoting of said first-named hook in a direction away from said second-named hook.

6. An automatic coupler comprising a body having a forwardly opening cavity therein, a hook projecting into said cavity and pivotally connected therewithin to said body, spring means acting between a side of said body and said hook forwardly of the pivotal connection therebetween for urging said hook toward an opposite side of said body, means associated with said body and acting on said hook for swinging said hook toward said first-named side in opposition to said spring means, and means mounted on said body for limiting pivoting of said hook toward said other side under force of said spring means, said mounted means on swinging of said hook toward said first-named side under a force applied thereto by said associated means being adapted to act in response to said force on and pivot a hook of a coupler mated with said first named coupler toward the opposite side.

7. An automatic coupler comprising a body having a forwardly opening cavity therein, a hook projecting into said cavity and pivotally connected therewithin to said body, spring means acting between one side of said body and a back of said hook forwardly of the pivotal connection therebetween for urging said hook toward the other side of said body, cam means pivotally mounted in said body for limiting movement of said hook toward said other side under force of said spring means, means connected to said body for applying to said hook a force to pivot said hook toward said one side in opposition to said spring means, and means on and interconnecting said hook and cam means rearwardly of a pivot of said cam means for applying through said hook and cam means in response to said force of said connected means on said hook a camming force on a hook of a coupler mated with said first-named coupler and thereby pivoting said second-named hook away from said first-named hook toward said other side of said body.

forwardly opening cavity therein, a hook projecting into said cavity and pivotally connected therewithin to said 8. An automatic coupler comprising a body having a body, spring means acting between one side of said body and a back of said hook forwardly of the pivotal connection therebetween for urging said hook toward the other side of said body, cam means pivotally mounted in said body for limiting movement of said hook toward said other side under force of said spring means, plunger means connected to said hook rearwardly of the pivotal connection thereof for applying thereto a force to pivot said hook toward said one side in opposition to said spring means, and means on and interconnecting said hook and cam means rearwardly of a pivot of said cam means for applying through said hook and cam means in response to said force of said connected means on said hook a camming force on a hook of a coupler mated with said first-named coupler and thereby pivoting said second-named hook away from said first-named hook toward said other side of said body.

9. An automatic coupler comprising a body having a forwardly opening cavity therein, a hook projecting into said cavity and pivotally connected therewithin to said body, spring means acting between one side of said body and a back of said hook forwardly of the pivotal connection therebetween for urging said hook toward the other side of said body, cam means pivotally mounted in said body for limiting movement of said hook toward said other side under force of said spring means, plunger means connected to said hook rearwardly of the pivotal connection thereof and projecting laterally of said body through said one side thereof, lever means operatively connected to said plunger means for applying therethrough to said hook a force to pivot said hook toward said one side of said body in opposition to said spring means, and means on and interconnecting said hook and cam means rearwardly of a pivot of said cam means for applying through said hook and cam means in response to said force of said connected means on said hook a camming force on a hook of a coupler mated with said first-named coupler and thereby pivoting said second-named hook away from said first-named hook toward said other side of said body.

10. An automatic coupler comprising a body having a forwardly opening cavity therein, a hook projecting into said cavity and pivotally connected therewithin to said body, spring means acting between one side of said body and a back of said hook forwardly of the pivotal connection therebetween for urging said hook toward the other side of said body, cam means pivotally mounted in said body for limiting movement of said hook toward said other side under force of said spring means, plunger means connected to said hook rearwardly of the pivotal connection thereof and projecting laterally of said body through said one side thereof, manually actuated lever means operatively connected to said plunger means for applying therethrough to said hook a force to pivot said hook toward said one side of said body in opposition to said spring means, and means on and interconnecting said hook and cam means rearwardly of a pivot of said cam means for applying through said hook and cam means in response to said force of said connected means on said hook a camming force on a hook of a coupler mated with said first-named coupler and thereby pivoting said second-named hook away from said first-named hook toward said other side of said body.

11. An automatic coupler comprising a body having a forwardly opening cavity therein, a hook projecting into said cavity and pivotally connected therewithin to said body, spring means acting between one side of said body and a back of said hook forwardly of the pivotal connection therebetween for urging said hook toward the other side of said body, cam means pivotally mounted in said body for limiting movement of said hook toward said other side under force of said spring means, plunger means connected to said hook rearwardly of the pivotal connection thereof and projecting laterally of said body through said one side thereof, lever means mounted on said body and operatively connected to said plunger means outwardly of said one side for applying through said plunger means on said hook a force to pivot said hook toward said one side of said body in opposition to said spring means, means mounted on said body and connected to said lever means for automatic actuation thereof, and means on and interconnecting said hook and cam means rearwardly of a pivot of said cam means for applying through said hook and cam means in response to said force of said connected means on said hook a camming force on a hook of a coupler mated with said first-named coupler and thereby pivoting said second-named hook away from said first-named hook toward said other side of said body.

12. An automatic coupler comprising a body having a forwardly opening cavity therein, a hook extending into said cavity and pivotally connected therewithin to said body, a torsion spring in said body and having a leg reacting against one side of said cavity and another leg carrying a roller engaging a back of said hook forwardly of the pivotal connection thereof for urging said hook toward an opposite side of said body, means on said one side for adjusting the force exerted by said spring on said hook, cam pivotally mounted in said cavity for limiting pivoting of said hook under force of said spring means, means operatively connected to said hook rearwardly of said pivotal connection for pivoting said hook toward said one side in opposition to said spring, an arm on and projecting rearwardly of the pivot of said cam and received in a forwardly facing pocket in said hook rearwardly of a pulling face thereof, and a jaw on said hook outwardly bounding said pocket and having a bearing face engageable with a bearing surface on said arm for transmitting force from and to said hook through said cam to and from a hook of a coupler mated with said first-named coupler, respectively, for pivoting said second-named hook away from said first-named hook and in response to a force applied through second-named hook preventing said first-named hook from pivoting away therefrom.

13. An automatic coupler comprising a body having a forwardly opening cavity therein and connectable rearwardly to a yoke for relative vertical pivoting therebetween, a hook projecting into said cavity and pivotally connected therewithin to said body, spring means acting between one side of said body and said hook forwardly of the pivotal connection therebetween for swinging said hook toward the other side of said body, a lever mounted on said body outwardly of said one side, a plunger operatively connecting said lever to a tail of said hook rearwardly of the pivotal connection thereof for swinging said hook toward said one side in opposition to said spring means, power means mounted on said body for actuating said lever, cam means mounted in said cavity intermediate a front end thereof and said pivotal connection for limiting swinging of said hook toward said other side under force of said spring, and rearwardly projecting means on said cam and interconnected rearwardly of a pivot thereof with means on said hook, said interconnected means on swinging of said first-named hook toward said one side by actuation of said lever by said power means transmitting from said hook through a portion of said cam forwardly of a pivot thereof to a hook of a coupler mated with said first-named coupler a force for swinging said second-named hook away from said first-named hook toward said one side of said body.

14. An automatic coupler connectable for relative vertical swinging to a yoke, comprising a body having a forwardly opening cavity therein, a hook projecting into said cavity and pivotally connected therewithin to said body, spring means acting between one side of said body and said said hook forwardly of the pivotal connection therebetween for swinging said hook toward an opposite side of said body, lever means mounted on said one side of said body and operatively connected to said hook rearwardly of the pivotal connection thereof for swinging said hook inwardly toward said one side in opposition to said spring means, power means supported on said body for actuating said lever means, and cam means pivotally mounted in said cavity forwardly of the pivotal connection of said hook to said body for limiting swinging of said hook under force of said spring means and transmitting force from said hook on swinging thereof by said lever means to a hook of a coupler mated with said first-named coupler for swinging last-named hook away from first-named hook.

15. An automatic coupler connectable for relative vertical swinging to a yoke, comprising a body having a forwardly opening cavity therein, a hook projecting into said cavity and pivotally connected therewithin to said body, spring means acting between one side of said body and said hook forwardly of the pivotal connection therebetween for swinging said hook toward an opposite side of said body, lever means mounted on said one side of said body and operatively connected to said hook rearwardly of the pivotal connection thereof for swinging said hook inwardly toward said one side in opposition to said spring means, power means mounted on an underside of said body crosswise thereof for actuating said lever means, and cam means pivotally mounted in said cavity forwardly of the pivotal connection of said hook to said body for limiting swinging of said hook under force of said spring means and transmitting force from said hook on swinging thereof by said lever means to a hook of a coupler mated with said first-named coupler for swinging last-named hook away from first-named hook.

References Cited by the Examiner
UNITED STATES PATENTS

| | | | |
|---|---|---|---|
| 814,924 | 3/06 | Tomlinson | 213—104 |
| 2,214,036 | 9/40 | Van Dorn | 213—104 X |
| 2,271,770 | 2/42 | Kinne | 213—104 |
| 2,843,056 | 7/58 | Browne | 213—76 X |
| 2,935,211 | 5/60 | Metzger | 213—100 |
| 2,956,694 | 10/60 | Metzger | 213—100 |

LEO QUACKENBUSH, *Primary Examiner.*